United States Patent
Zhang et al.

(10) Patent No.: US 8,940,461 B2
(45) Date of Patent: Jan. 27, 2015

(54) METHOD FOR MEMBRANE ELECTRODE ASSEMBLY FABRICATION AND MEMBRANE ELECTRODE ASSEMBLY

(75) Inventors: Junliang Zhang, Rochester, NY (US); Matthew Dioguardi, Rochester, NY (US); Frederick T. Wagner, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 839 days.

(21) Appl. No.: 12/731,216

(22) Filed: Mar. 25, 2010

(65) Prior Publication Data

US 2011/0236788 A1 Sep. 29, 2011

(51) Int. Cl.
*H01M 8/10* (2006.01)
*H01M 4/88* (2006.01)
*H01M 4/92* (2006.01)

(52) U.S. Cl.
CPC .......... *H01M 8/1004* (2013.01); *H01M 4/8814* (2013.01); *H01M 4/8828* (2013.01); *H01M 4/8882* (2013.01); *H01M 4/8896* (2013.01); *H01M 4/926* (2013.01); *Y02E 60/521* (2013.01)
USPC ............................. 429/535; 429/479; 429/507

(58) Field of Classification Search
CPC .......................................... H01M 4/86–4/8896
USPC ........................... 429/479–496, 507–511, 535
See application file for complete search history.

(56) References Cited

U.S. PATENT DOCUMENTS

| | | | |
|---|---|---|---|
| 4,808,493 A * | 2/1989 | Breault | 429/524 |
| 5,441,764 A * | 8/1995 | Collin et al. | 427/226 |
| 5,843,519 A * | 12/1998 | Tada | 427/115 |
| 6,524,736 B1 * | 2/2003 | Sompalli et al. | 429/535 |
| 2002/0192383 A1 * | 12/2002 | Lo et al. | 427/359 |
| 2003/0003343 A1 * | 1/2003 | Cisar et al. | 429/36 |
| 2003/0060356 A1 * | 3/2003 | Iwasaki et al. | 502/101 |
| 2004/0038808 A1 * | 2/2004 | Hampden-Smith et al. | 502/180 |
| 2004/0071881 A1 * | 4/2004 | Wang et al. | 427/372.2 |
| 2004/0131919 A1 * | 7/2004 | Yasumoto et al. | 429/42 |
| 2005/0019649 A1 * | 1/2005 | Kakutani et al. | 429/42 |
| 2005/0072514 A1 | 4/2005 | Yan et al. | |

(Continued)

FOREIGN PATENT DOCUMENTS

| | | |
|---|---|---|
| CN | 1623243 A | 6/2005 |
| CN | 1838456 A | 9/2006 |

(Continued)

OTHER PUBLICATIONS

Non-Final Office Action dated Sep. 19, 2011 pertaining to U.S. Appl. No. 12/255,257, filed Oct. 21, 2008.

(Continued)

*Primary Examiner* — Jonathan Crepeau
*Assistant Examiner* — Jacob Buchanan
(74) *Attorney, Agent, or Firm* — Dinsmore & Shohl LLP

(57) ABSTRACT

A method of coating carbon based electrodes and thick electrodes without mud-cracking is described. The electrode ink is deposited on a decal substrate, and transferred to a hot press before the electrode ink is completely dried. The partially dried electrode ink is hot pressed to the membrane to form a membrane electrode assembly. A membrane electrode assembly including a polymer membrane; and a pair of crack-free electrode layers on opposite sides of the polymer membrane, each of the pair of electrode layers having a thickness of at least about 50 µm is also described.

15 Claims, 1 Drawing Sheet

(56) References Cited

U.S. PATENT DOCUMENTS

| | | |
|---|---|---|
| 2005/0084727 A1* | 4/2005 | Kiefer et al. ............... 429/33 |
| 2006/0040045 A1 | 2/2006 | Limmer et al. |
| 2006/0257641 A1* | 11/2006 | Cho et al. ............... 428/307.3 |
| 2006/0263674 A1* | 11/2006 | Hosoya et al. ............... 429/44 |
| 2007/0190253 A1* | 8/2007 | Matsunaga ............... 427/282 |
| 2008/0128074 A1* | 6/2008 | Mah et al. ............... 156/182 |
| 2009/0208805 A1* | 8/2009 | Wakabayashi et al. ......... 429/30 |
| 2010/0062306 A1* | 3/2010 | Oota et al. ............... 429/30 |
| 2010/0261089 A1* | 10/2010 | Morioka et al. ............... 429/481 |

FOREIGN PATENT DOCUMENTS

| | | | |
|---|---|---|---|
| WO | 2006005658 A2 | 1/2006 | |
| WO | WO 2009/004958 | * 1/2009 | ............ H01M 8/02 |

OTHER PUBLICATIONS

Final Office Action dated Mar. 29, 2012 pertaining to U.S. Appl. No. 12/255,257, filed Oct. 21, 2008.

Advisory Action dated Jun. 21, 2012 pertaining to U.S. Appl. No. 12/255,257, filed Oct. 21, 2008.

* cited by examiner

METHOD FOR MEMBRANE ELECTRODE ASSEMBLY FABRICATION AND MEMBRANE ELECTRODE ASSEMBLY

FIELD OF THE INVENTION

The present invention relates generally to fuel cells, and specifically to a method for making a membrane electrode assembly and to a membrane electrode assembly.

BACKGROUND OF THE INVENTION

Electrochemical conversion cells, commonly referred to as fuel cells, which produce electrical energy by processing first and second reactants, e.g., through oxidation and reduction of hydrogen and oxygen. By way of illustration and not limitation, a typical polymer electrolyte fuel cell comprises a polymer membrane (e.g., a proton exchange membrane (PEM)) that is positioned between a pair of gas diffusion media (DM) layers and catalyst layers. A cathode plate and an anode plate (or bipolar plates BPP) are positioned at the outermost sides adjacent the gas diffusion media layers, and the preceding components are tightly compressed to form the cell unit.

The catalyst layers can be attached to the PEM forming a membrane electrode assembly (MEA). One method of forming an MEA involves depositing an electrode ink on the PEM by direct spraying or coating in a shim frame. Due to the creeping of the PEM when it becomes wet, this method is usually difficult to control. Alternatively, the electrode can be formed on a decal and transferred to the PEM. Typically, the powder catalyst and ionomer solution are dispersed in a mixed solvent which usually contains one or more alcohols and water in a specific ratio that depends on the type of catalyst. The mixture is then homogenized by ball-milling for 2-3 days before coating on a decal substrate. For shim coating, the catalyst loading can be controlled by the thickness of the shim; for the Mayer rod coating, the catalyst loading can be controlled by the thread number. Multiple coatings can be applied for higher catalyst loading, with a drying step in between every two consecutive coatings. After the catalyst/ionomer coated decal dries out, the catalyst/ionomer is then transferred onto a PEM by hot press to form an MEA. The anode and cathode can be hot-pressed onto a PEM simultaneously. The pressure and time for the hot press may vary for different types of MEAs. Alternatively, the catalyst/ionomer ink can be coated on a diffusion media, followed by hot press onto the PEM upon its drying out.

An electrode ink typically contains ionomer, organic solvents such as isopropyl alcohol, ethanol, etc. and electrocatalyst. Additional materials can be incorporated into the electrode ink to increase the electrode performance robustness. Ionic conducting components can be incorporated into the electrode ink, if desired. Hydrophobic particles, for example, PTFE, can be incorporated into the electrode ink to improve the electrode water management capability, if desired. Graphitized or amorphous carbon powder or fiber, other durable particles, or other electrocatalysts like Pt supported on carbon can also be incorporated into the electrode ink to increase the electrode water storage capacity, if desired.

Carbon-based electrodes, such as high surface area carbon (HSC) and graphitized carbon, typically include carbon, which can function as the catalyst and/or the catalyst support, an optional metal catalyst, and ionomer as the binder and ion conductor.

When carbon-based electrodes are used in the MEA, mud-cracking, non-uniform coating, and decal transfer are difficult challenges, particularly when an ultra-thick electrode (e.g., about 12 microns or more) is needed. A mud-cracked or non-uniform electrode has a detrimental effect on the performance and durability of the MEA.

Methods of reducing mud-cracking have been developed, including using a high boiling point solvent, adding an acid to the catalyst ink, and mixing catalyst with carbon fibers. Generally, these additives are added to the electrode ink before ball-milling. For example, the high boiling point solvent can be ethylene glycol, glycol ethers or glycol esters such as propylene glycol butyl ether (PGBE), etc. The additive acid can be diluted nitric acid. However, the use of the high boiling point solvent and acid additives have potential poison effects on the electrode, and the use of carbon fiber increases the risk of cell shorting and cross-over.

Therefore, there is a need for a method of making MEAs using non-noble metal catalyst electrodes, such as carbon-based electrodes, or thick electrodes without mud-cracking or increasing the risk of shorting or cross-over.

SUMMARY OF THE INVENTION

The present invention meets this need. In one embodiment, a method of fabricating a membrane electrode assembly is provided. The method includes depositing a layer of electrode ink on a decal substrate; partially drying the electrode ink to form an electrode layer; and hot pressing the partially dried electrode layer to a membrane to form the membrane electrode assembly.

Another aspect of the invention involves a membrane electrode assembly. The membrane electrode assembly includes a polymer membrane; and a pair of crack-free electrode layers on opposite sides of the polymer membrane, each of the pair of electrode layers having a thickness of at least about 50 μm.

DETAILED DESCRIPTION OF THE INVENTION

Figure 1:
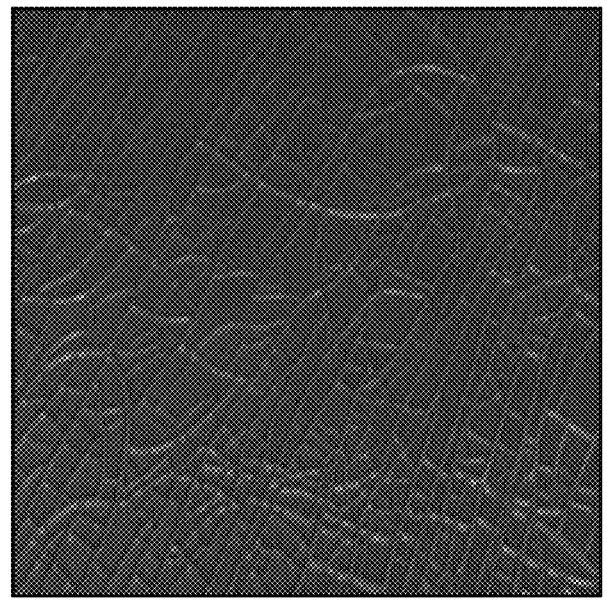
FIG. 1 shows a digital photograph of carbon coated on ePTFE with a thickness of 30 μm made using a conventional method.

A method has been developed which can be used for making electrodes or thick electrodes. The method involves coating the catalyst ink on a decal substrate. Before the mud is completely dried, the decal is transferred to the hot plates and pressed onto the PEM. Using the method, uniform catalyst layers up to 100 μm thick were successfully coated on a PEM.

The method can be used to make electrodes containing non-noble metal catalysts, including, but not limited to, carbon-based catalysts, if desired.

In one embodiment, the catalyst is coated on a decal substrate. The decal substrate should be chemically stable, flat, and smooth. It can be a porous material or a nonporous material. Suitable decal substrates include, but are not limited to, ethylene tetrafluoroethylene (ETFE), expanded polytetrafluoroethylene (ePTFE), or polyimide film. The catalyst is coated on the decal substrate in a shim frame with a specified thickness. The use of the shim frame makes it easier to obtain a uniform coating thickness. The shim frame can be made of a material which is dimensionally stable and which does not interact with any of the components of the electrode ink. Good-quality shim materials with uniform thickness are commercially available. Suitable materials include, but are not limited to, polyimide film (e.g., DuPont Kapton®), polyethylene naphthalate film (PEN) (e.g., DuPont Teonex®), ETFE, stainless steel, and the like.

The catalyst ink is partially dried in the shim frame. A vacuum can be used to help dry the ink, if desired. Before the ink is completely dry (and thus before any cracking occurs), the electrode layer is transferred to the hot press. The electrode layer will still contain moisture, but there is no visible liquid and no particles flow. The electrode layer is hot pressed to the PEM. The drying of the electrode layer continues during the hot press. Vacuum can be applied during the hot press, if desired. The hot press time will depend on the temperature, pressure, vacuum, and thickness of the electrode layer. Suitable hot press times for particular applications can easily be determined by those skilled in the art.

The electrode layer is typically about 1 to about 20 µm. If a thick electrode is desired, the electrode layer can be at least about 12 µm, or at least about 20 µm, or at least about 30 µm, or at least about 40 µm, or at least about 50 µm, or at least about 60 µm, or at least about 70 µm, or at least about 80 µm, or at least about 90 µm, or at least about 100 µm, or at least about 120 µm, or more. Mud-crack free electrode layers can be made even at high thicknesses using the method.

Multiple layers can be applied in the shim frame, if desired. There should be a partial drying step before each additional layer is deposited.

In another embodiment, the shim frame is not used. Instead, multiple coatings are applied to the decal substrate. There should be a drying step before each additional layer is deposited. This approach could be used advantageously in a mass production process.

FIG. 1 shows a photograph of carbon/ionomer layer coated on an ePTFE decal substrate (7 cm×7 cm) with the conventional method. To do this, 1 g of carbon (Vulcan® XC72 from Cabot) and 4.2 g of ionomer solution (DE2020 from DuPont) were mixed with mixture of solvents that contained 7.22 g ethanol, 1.78 g isopropyl alcohol (IPA), 5.79 g DI water (Millipore). The mixture was ball-milled in a plastic bottle with zirconia beads for 2 days. The ink was coated on an ePTFE decal with an 120-Mayer-rod. After the decal dried out, the thickness of the catalyst/ionomer coating was measured to be 30 µm. The photograph shows that there are many cracks visible even before the electrode was transferred onto a PEM.

Figure 2:
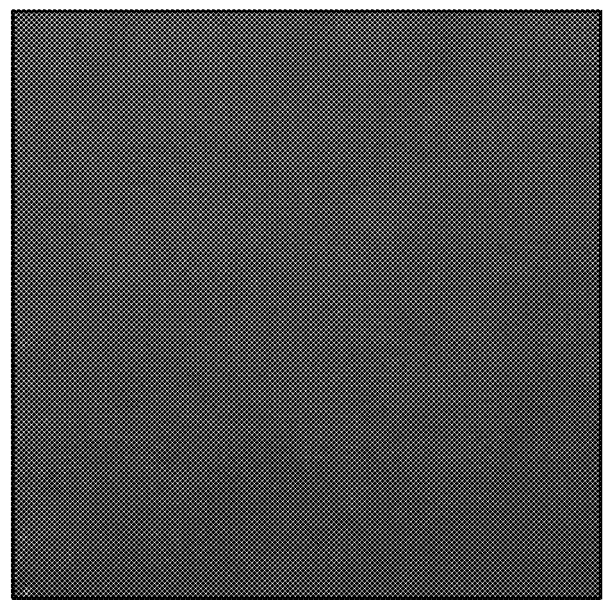
FIG. 2 shows a digital photograph of carbon coated on a PEM with a thickness of 100 μm made using one embodiment of the method of the present invention.

FIG. 2 shows a photograph of carbon coated on a PEM (7 cm×7 cm). To do this, the same electrode ink as above was used for coating. The ink was coated on an ePTFE decal substrate in a Kapton® shim frame having a thickness of 500 µm, with a smooth flat PTFE coating bar. Upon the coating being almost dried out but before cracks appearing, a second coating was applied without removing the shim frame. To speed up the drying process, the ePTFE decal was extended on one side of a porous graphite plate that was applied with a vacuum on the other side. The vacuum was applied for about 5 mins until no liquid was visible on the surface. The decal was transferred to the hot press and pressed onto a PEM at 295° F. and 200 psi for 4 mins. The catalyst layer was measured to have a dry thickness of about 100 µm on the PEM and shows no cracking.

The method allows the fabrication of a crack-free electrode layer having a uniform thickness without using extra additives in the electrode ink, and without increasing the risk of shorting or cross-over. By "crack-free," we mean that no cracks are visible under transmitted light microscopy.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of fabricating a membrane electrode assembly comprising:
   depositing a layer of electrode ink on a decal substrate;
   placing the decal substrate on one side of a porous graphite plate;
   partially drying the electrode ink by applying a vacuum to one side of said porous graphite plate until no visible liquid remains on the surface to form an electrode layer that has a uniform thickness of at least about 120 microns thick without using extra additives; and
   hot pressing the partially dried electrode layer to a membrane to form the membrane electrode assembly (MEA) wherein said MEA is free of mudcracking.

2. The method of claim 1 wherein the electrode ink is deposited in a shim frame.

3. The method of claim 2 wherein the shim frame is made of polyimide, polyethylene naphthalate, ETFE, or stainless steel.

4. The method of claim 1 wherein at least two layers of electrode ink are deposited on the decal substrate.

5. The method of claim 4 wherein each layer of electrode ink is partially dried before depositing the next layer of electrode ink.

6. The method of claim 1 further comprising applying a vacuum while hot pressing the partially dried electrode ink layer.

7. The method of claim 1 wherein the decal substrate is made of a porous material.

8. The method of claim 1 wherein the decal substrate is made of ETFE, ePTFE, or polyimide.

9. The method of claim 1 wherein the electrode ink contains a non-noble metal catalyst.

10. The method of claim 1 wherein the electrode ink contains a carbon-containing catalyst.

11. A method of fabricating a membrane electrode assembly comprising:
- depositing a layer of electrode ink on a decal substrate, the electrode ink containing a non-noble metal catalyst;
- placing the decal substrate on one side of a porous graphite plate;
- partially drying the electrode ink by applying a vacuum to one side of said porous graphite plate until no visible liquid remains on the surface to form an electrode layer that has a uniform thickness of at least about 120 microns thick without using extra additives;
- applying a vacuum to the electrode ink;
- hot pressing the partially dried electrode layer to a membrane to form the membrane electrode assembly and wherein said membrane electrode assembly is free of cracks visible in each of said layers under transmitted light microscopy.

12. The method of claim 11 further comprising applying a vacuum while hot pressing the partially dried electrode ink layer.

13. The method of claim 11 wherein the electrode ink is deposited in a shim frame.

14. The method of claim 11 wherein at least two layers of electrode ink are deposited on the decal substrate.

15. The method of claim 14 wherein each layer of electrode ink is partially dried before depositing the next layer of electrode ink.

* * * * *